M. SKRETA.
ADVERTISEMENT DISPLAYING APPARATUS.
APPLICATION FILED AUG. 3, 1914.

1,214,962.

Patented Feb. 6, 1917.
3 SHEETS—SHEET 2.

WITNESSES
John A. Percival
Maurice R. Baker

INVENTOR
MAXIMILIAN SKRETA
BY Edwin Marks
ATTORNEY

M. SKRETA.
ADVERTISEMENT DISPLAYING APPARATUS.
APPLICATION FILED AUG. 3, 1914.

1,214,962.

Patented Feb. 6, 1917.
3 SHEETS—SHEET 3.

WITNESSES
John A. Percival.
Maurice R. Baker.

INVENTOR
MAXIMILIAN SKRETA
BY
ATTORNEY

UNITED STATES PATENT OFFICE.

MAXIMILIAN SKRETA, OF VIENNA, AUSTRIA-HUNGARY.

ADVERTISEMENT-DISPLAYING APPARATUS.

1,214,962.     Specification of Letters Patent.     Patented Feb. 6, 1917.

Application filed August 3, 1914. Serial No. 854,829.

*To all whom it may concern:*

Be it known that I, MAXIMILIAN SKRETA, a subject of the Emperor of Austria-Hungary, and residing at No. 47 Linzerstrasse, Vienna, XIII, Austria-Hungary, have invented certain new and useful Improvements in Advertisement-Displaying Apparatus, of which the following is a specification.

This invention relates to an improved apparatus for displaying advertisements belonging to that type of apparatus specified more fully hereinafter.

There already exists various forms of advertisement displaying apparatus in which a picture or film band is fed periodically so that new advertisement pictures appear at definite intervals.

All these apparatus, however, possess an extremely complex mechanism for effecting a stoppage of the feed each time after an advertisement picture has made its appearance, a restarting of the feed of the same, and further for reversing the movement when the film band has been completely unwound from one roller onto the other.

This invention has for its object to provide an improved advertisement displaying apparatus of the type in which provision is made for a periodical feed of the picture or film band in which, however, all the disadvantages of the existing apparatus of this type are eliminated.

With this object in view the invention substantially consists in an apparatus of the above type, in which both the starting and stopping of the feed mechanism as well as the reversal of the direction of movement are effected pneumatically.

The invention is illustrated by way of example in the accompanying drawings, in which:—

Figure 1 is a front elevation of the improved advertising apparatus with the film band removed.

Fig. 1ª is a section through a part of the pneumatic device showing a modification.

Figure 1:
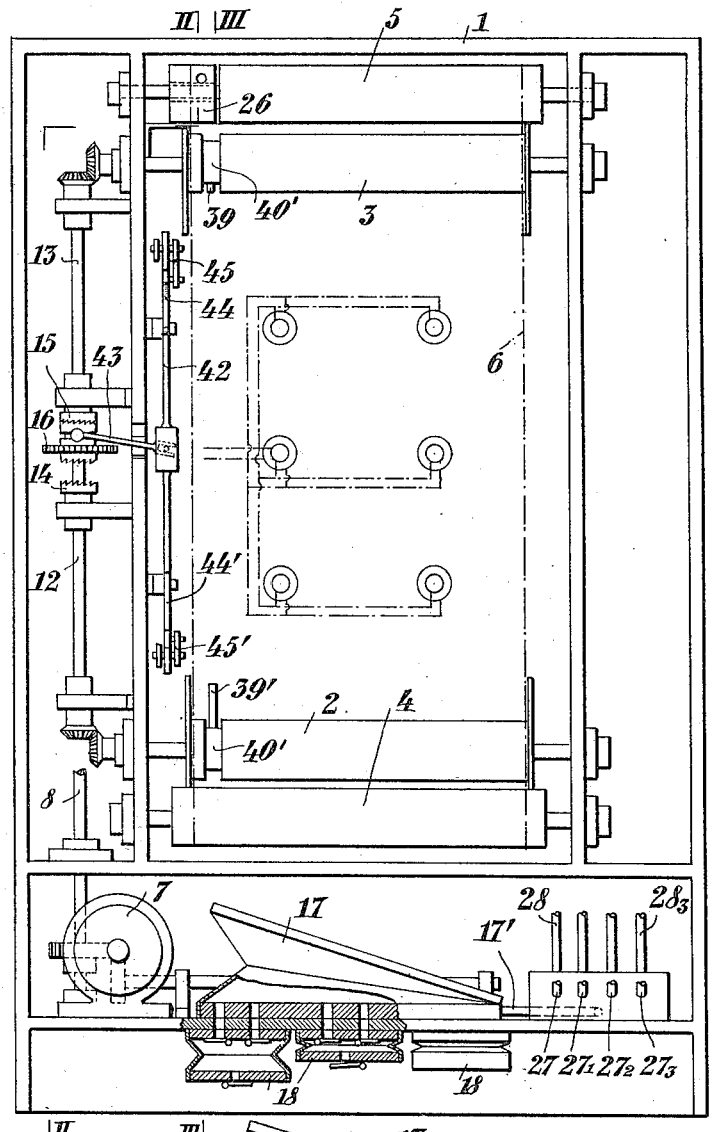

In carrying the invention into effect as shown in the drawings, two rollers 2, 3 are mounted in the case 1 by which the film band 6 guided over suitable guide rollers 4, 5 is wound in the one direction or in the other. The driving power is provided by a motor 7, which keeps a shaft 8 in constant rotation by aid of a worm and worm wheel. On the shaft 8 there is mounted a clutch 9 which is free to slide but is prevented from turning with respect to the shaft, and which can be made to engage on the one hand with a worm 10 loosely and rotatably mounted on the shaft 8, and on the other hand with a toothed wheel 11, likewise loosely and rotatably mounted on the shaft 8. The drive of the rollers 2 and 3 is effected by shafts or spindles 12, 13 arranged in the axial prolongation of each other and acting on the rollers 2 and 3 respectively by means of bevel wheels. The adjacent ends of the shafts 12 and 13 are provided with coupling parts 14 and 15 respectively, with which a gear wheel 16 mounted slidably on the ends of the aforementioned shafts and in constant mesh with the toothed wheel 11 can be made to engage. According as the gear wheel 16 is in engagement with the clutch 14 or with the clutch 15, the driving mechanism rotates either the roller 2 or the roller 3.

The clutch 9 serves for stopping the driving mechanism or for starting the apparatus, while the coupling parts connected with the gear wheel 16 serve to reverse the apparatus, since according to the position of this clutch, either the film band or web is wound from the roller 3 on to the roller 2 or conversely from the roller 2 on to the roller 3.

Figure 4:
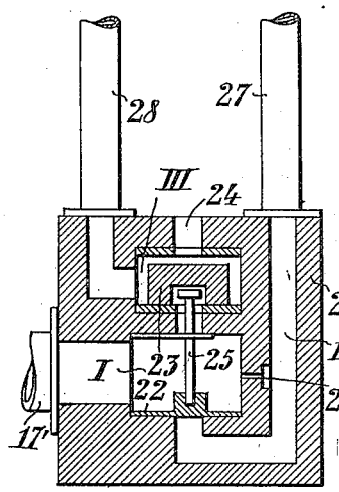
Fig. 4 is a section through a detail.

The control of the clutch, according to this invention, is effected pneumatically. For this purpose in the present case there is provided in the casing 1 a suction device consisting of bellows 17. This suction device is in communication with bellows 18 which are driven by a shaft 19 constantly rotated by the aid of suitable eccentrics by the motor 7. Owing to the provision of three bellows 18 actuated one after the other in consequence of the eccentrics being suitably staggered in relation to each other, a constant suction action is produced in the bellows 17 which is limited in its movement by suitable stops. The bellows 17 are connected with reversing or switching means which act as relays and are hereinafter briefly referred to as "switches". For each of the four functions, i. e., throwing the film band into operation and out of operation, and holding the clutch in the position corresponding to the one or the other direction of feed, a special switch is necessary, and in the example shown in the drawings, the whole of the four switches are accommodated in a common casing 20. Each switch consist of a suction chamber I (see Fig. 4) in communication with the suction device 17 and two accessory chambers II and III. In the illustrated example, the whole of the switches have a common suction chamber I, which is in communication through a pipe 17' with the suction device 17 but the chambers II and III are independent for each switch. Each accessory chamber II is shut off by a diaphragm 22 from the suction chamber I and is in constant communication with the suction chamber I only through a narrow bore 21. Each second accessory chamber III is shut off from the suction chamber I by a valve 23 and is in communication by a channel 24 with the outer air, the valve 23 acting as a double acting or duplex valve and is so mounted that according to its position it either shuts off the corresponding accessory chamber III from the outer air and puts it into communication with the suction chamber I, or vice versa. The valve 23 is influenced by the diaphragm 22 which is connected by a link 25 with the valve 23. The mode of operation of one of the switches will now be explained by way of example, for bringing the movement of the film band to a standstill.

The film band is guided over the guide roller 5, its edge sliding over a stationary part 26 adapted to the shape of the guide roller 5. This part 26 is provided with a bore, with which the pipe 27 leading into the accessory chamber II of the switch is in communication. The bore of the part 26 is shut off from without by the film band sliding over it. The latter is provided at suitable intervals with holes which from time to time put the pipe 27 and consequently the accessory chamber II of the switch into communication with the outer air. In the normal position therefore the accessory chamber II is shut off from the outer air by the film band.

Owing to the suction device actuated by the driving motor 7, a depression, i. e., a pressure below atmospheric pressure exists in the suction chamber I, and owing to the capillary communication 21 also in the suction chamber II. If then the pipe 27 is thrown open by an aperture in the film coming to lie over the bore of the part 26, air from the outside flows into the accessory chamber II of the switch, in consequence of which, owing to the difference of pressure, an expansion of the diaphragm 22 takes place and consequently a control of the valve 23. Therefore the suction chamber I is brought into communication with the accessory chamber III which is at the same time shut off from the outer air. The chamber III is in communication through a pipe 28 with working bellows 29 which act on the clutch 9 by a lever transmission 30, 31.

Figure 2:
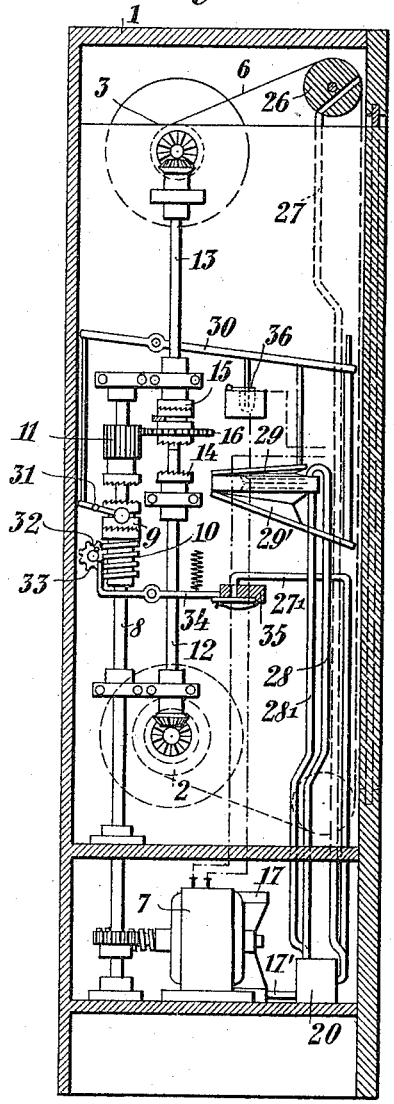
Fig. 2 is a section through the same on the line II—II.

Owing to the accessory chamber III being made to communicate with the suction chamber I, the bellows 29 have the air drawn from them, in consequence of which they collapse and through the lever transmission 30, 31 bring the clutch 9 into engagement with the worm 10 (position shown in Fig. 2). The worm is now driven and sets a worm wheel 33 rotating, which is provided with a projection 32 which after a definite turning movement of the wheel 33, occasions the pivoting movement of a resiliently mounted lever 34 which acts on a valve 35 operating on the pipe 27' of the switch for the bellows 29'.

The now opened valve 35 allows air to flow through the pipe 27' into the accessory chamber II of this switch, whereby in exactly the same way as described in connection with the first switch, the working bellows 29' are evacuated and the clutch 9 again comes into engagement with the toothed wheel 11.

By positively connecting the lever 30 with both bellows 29 and 29' there occurs at the same time an upward movement of the bellows 29, which during this movement draw fresh air through the pipe 28 from the accessory chamber III which has in the meantime, owing to the return of the valve 23, been put into communication with the outer air.

With the lever 30 the contacts 36 for illuminating are also connected so that on each control movement the light is switched on and off.

In order to effect the feed of the film band by means of the driving mechanism which is thrown again into operation, the pipe 27 must be shut off from the outer air. If, for instance, the aperture in the film band establishing the communication with the outer air is slit, then in spite of the feed of the film band, the pipe 27 would remain open, so that by this means the driving mechanism would immediately be thrown out of operation again as described above.

Figure 5:
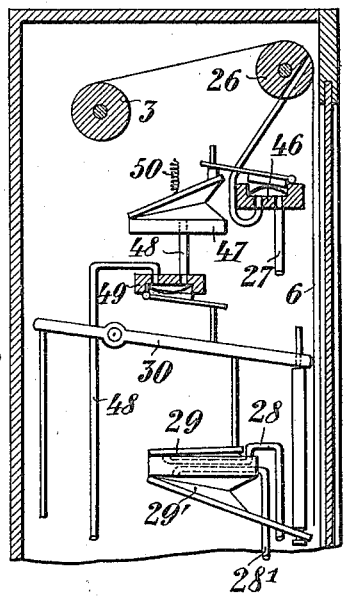
Fig. 5 is a side elevation of means for insuring the feed of the picture or film band.

In order to prevent this and to insure in any case a feed of the film band, there is interposed a diaphragm valve 46 in the pipe 27 as shown in the form of the improved apparatus illustrated in Fig. 5, which valve is operated by separate working bellows 47 under the action of a spirng, which bellows are connected by a pipe 48 to the suction device 17. In the pipe 48 a diaphragm valve 49 is arranged, the diaphragm of which is connected up to the lever 30 actuated by the working bellows 29, 29'.

The mode of operation of this device is as follows:—

By turning the lever 30 the bellows 47 are placed in communication with the suction device, whereby the bellows 47 are caused to collapse against the action of the spring 50 and to shut the valve 46. In Fig. 5, the different parts are shown in that relative position which they occupy at the moment of reversal.

During the motion of the film band the valve 49 is closed and owing to the positive connection of the bellows 47 and the valve 46, the pipe 27 is opened, which during working is shut off from the outer air by the film band 6.

In exactly the same manner in which the temporary stopping of the drive is effected, also the reversing of the same is effected by working bellows 37 and 37' connected to the pipes 28² and 28³ as well as by valves 38 and 38' closing the pipes 27² and 27³.

The actuation of the valves 38 and 38' is effected by means of levers 39, 39' which rest with their one arm on the film band wound around the roller 2 or 3, and which after the film has been unwound snap into a groove 40 and 40' of the rollers 3 or 2 respectively, and thus open the valves 38 or 38' respectively. The working bellows 37 and 37' actuate the levers 41 and 41' which are connected with each other by a link 42, with which a lever 43 in connection with the gear wheel 16 is in engagement.

Figure 3:
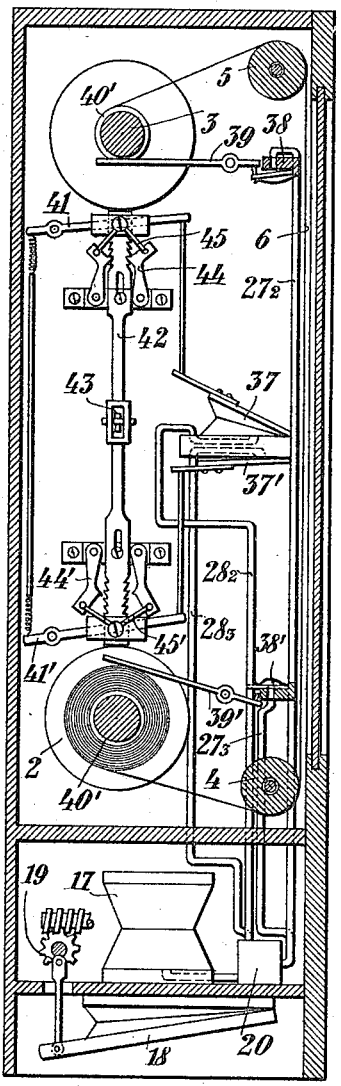
Fig. 3 is a section through the apparatus on the line III—III of Fig. 1.

According to the position of the bellows 37 or 37' the gear wheel is coupled either with the spindle 12 or 13 and thus the roller 2 or the roller 3 is driven. In order to hold the gear wheel 16 absolutely stationary in its working position which it assumes at the time, the link 42 is secured in its terminal positions. In the embodiment of the invention illustrated in Figs. 1 to 3 the ends of the link 42 are provided for this purpose with locking teeth, within the range of which pawls 44 and 44' respectively are rotatably mounted in the casing 1.

The pawls 44 and 44' are pivotally connected with the levers 41 and 41' by spreader levers 45 and 45', so that when these levers are turned, the pawls are shifted like scissor blades and therefore are put into or out of engagement with the link 42.

Figure 6:
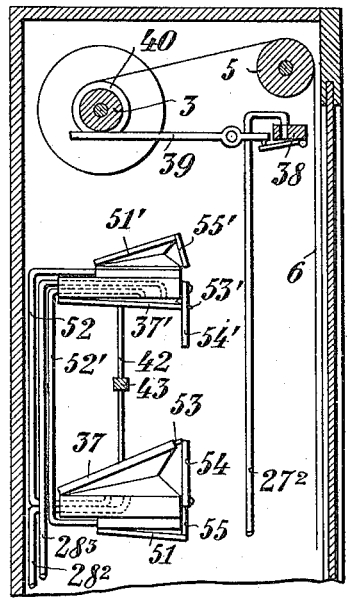
Figs. 6 and 7 are a side elevation and a rear elevation respectively of a modification of the arresting means for the driving mechanism.
Figure 7:
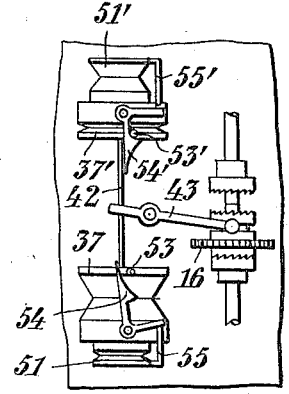

In Figs. 6 and 7 a further embodiment of the invention is shown by way of example in which the securing of the link 42 in its end positions is effected pneumatically.

The link 42 in this embodiment of the invention is secured directly to the working bellows 37 and 37' which for this purpose are arranged at a suitable distance from each other. Each bellows 37, 37' carries an auxiliary bellows 51 or 51' respectively, which are alternately connected with the opposite working bellows. The auxiliary bellows 51 are therefore in communication through a pipe 52' with the bellows 37' and the auxiliary bellows 51' through a pipe 52 with the bellows 37.

On the movable part of each bellows 37, 37' a pin 53, 53' is fixed, within the range of which a locking hook or pawl 54, 54' bent to assume an angular shape is rotatably mounted, on which a stop 55, 55' attached to each auxiliary bellows acts.

As soon as the bellows 37 or 37' contracts or the movable part of such bellows approaches the stationary part of the same the pin 53 or 53' respectively engages the hook 54 or 54' respectively, so that this contracted bellows is held in contracted position. As soon as the other bellows 51 or 51' contracts the projection 55 or 55' respectively actuates the hook 54 or 54' respectively so that the pin 53 or 53' respectively and also the corresponding bellows 37 or 37' are released.

The mode of operation is as follows:—

When the film band has run down and the lever 39 snaps into the groove 40 of the roller 3, the valve 38 is opened and the bellows 37 thus connected up to the suction chamber.

First of all there is an evacuation of the auxiliary bellows 51', whereby its stop 55' disengages the pawl 54' and releases the bellows 37'. Now the bellows 37 positively connected with the latter bellows can fold together or collapse so that a shifting of the link 42 and the gear wheel 16 connected with it takes place. At the same time the auxiliary bellows 51 are opened and the pin 53 comes within the reach of the pawl 54, so that the working bellows are secured in the folded or collapsed position.

It is obvious that the control of the various functions can be effected by means of a pressure producing device instead of a suction device.

In this case the valve arrangement of all pneumatic devices is reversed as shown for example in Fig. 1ª with respect to the bellows 18. Also a corresponding reversing of the mechanical devices takes place.

What I claim is:—

1. An advertisement displaying apparatus comprising in combination a display band, a roller at each end on which it is wound, pneumatically controlled means for rotating the rollers, pneumatically controlled means for reversing the direction of rotation, and a switch device for controlling the pneumatic operations.

2. An advertisement displaying apparatus comprising in combination a roller at each end of the apparatus, a display band wound on said rollers, a continuously running driving motor, pneumatically actuated means for throwing said rollers one at a time into driving connection with said motor, pneumatically actuated means for throwing both of said rollers out of driving connection with said motor, pneumatically actuated means for restoring the driving connection between said motor and one or other of said rollers, a switch device for controlling each of said pneumatically actuated means, and means for automatically operating said switch devices at the desired times.

3. An advertisement displaying apparatus comprising in combination a perforated display band, a roller at each end on which it is wound, a stationary member having openings with which the perforations in said band are adapted to register, a driving motor, a main shaft driven thereby, an auxiliary driving shaft to each of the said rollers, pneumatically controlled means for driving the display band in one direction and stopping the driving periodically, pneumatically controlled means for driving the display band in the other direction and also stopping the band periodically, a switch device for controlling the pneumatic operations, and means for operating said switch device by the passage of air through said openings in the stationary member.

4. An advertisement displaying apparatus comprising in combination a display band, a roller at each end on which it is wound, a driving motor, a main shaft driven thereby, an auxiliary driving shaft for each of the said rollers, pneumatically controlled means whereby the main shaft drives one of the said auxiliary shafts at a time, pneumatically controlled means whereby the main shaft ceases to drive both of the auxiliary shafts for a predetermined period, pneumatically controlled means whereby after the expiration of such period the main shaft again drives one of the auxiliary shafts, and a switch device for controlling the pneumatic operations.

5. An advertisement displaying apparatus comprising in combination a display band, a roller at each end on which it is wound, a driving motor, a main shaft driven thereby, an auxiliary shaft for driving each of the said rollers, a pneumatically actuated clutch whereby the main shaft drives one of the said auxiliary shafts at a time, a pneumatically controlled clutch whereby the main shaft ceases to drive both of the auxiliary shafts for a predetermined period, pneumatically controlled means whereby after the expiration of such period, the main shaft again drives one of the auxiliary shafts through the aforesaid pneumatic clutch, and a switch device for controlling the pneumatic operations.

6. An advertisement displaying apparatus comprising in combination a perforated display band, a roller at each end on which it is wound, a stationary member having openings with which the perforations in said band are adapted to register, a driving motor, a main shaft and an air pump driven thereby, pneumatic switch means partly under atmospheric pressure and partly under the influence of the air pump, an auxiliary shaft for driving each of the said band rollers, a pneumatic clutch controlled by the pneumatic switch, whereby the main shaft drives one of the said auxiliary shafts at a time, a pneumatic clutch, whereby the main shaft ceases to drive both of the auxiliary shafts for a predetermined period, pneumatically controlled means whereby after the expiration of such period the main shaft again drives one of the auxiliary shafts through the aforesaid pneumatic clutch, and means for operating said switch means by the passage of air through said openings in the stationary member.

7. An advertisement displaying apparatus comprising in combination a perforated display band, a roller at each end on which it is wound, a stationary member having openings with which the perforations in said band are adapted to register, a driving motor, a main shaft and an air pump driven thereby, an auxiliary shaft for driving each of the said band rollers, the shafts being co-axial with one another, a clutch member mounted near the adjacent ends of the auxiliary shafts, pneumatically controlled means for sliding the clutch member on to one or the other of the auxiliary shafts, a driving gear wheel on the clutch member, a toothed pinion on the driving shaft in mesh with the driving gear wheel, a pneumatically controlled clutch on the driving shaft for intermittently driving the pinion, pneumatic switch means partly under atmospheric pressure and partly under the influence of the air pump, and means for operating said switch means by the passage of air through said openings in the stationary member.

8. An advertisement displaying apparatus comprising in combination a perforated display band, a roller at each end on which it is wound, a stationary member having openings with which the perforations in said band are adapted to register, a driving motor, a main shaft and an air pump driven thereby, an auxiliary shaft for driving each of the said band rollers the shafts being co-axial with one another, a clutch member mounted near the adjacent ends of the auxiliary shafts, pneumatically controlled means for sliding the clutch member on to one or the other of the auxiliary shafts, and retaining the clutch member in its adjacent position, a driving gear wheel on the clutch member, a toothed pinion on the driving shaft in mesh with the driving gear wheel, a pneumatically controlled clutch on the driving shaft whereby the pinion may be driven for a predetermined period, then stopped, means operable from the driving shaft for again restoring the drive, pneumatic switch means partly under atmospheric pressure and partly under the influence of the air pump, and means for operating said switch means by the passage of air through said openings in the stationary member.

9. An advertisement displaying apparatus comprising in combination a perforated display band, a roller at each end on which it is wound, a stationary member having openings with which the perforations in said band are adapted to register, sliding devices in contact with the band on each roller, a driving motor, a main shaft and an air pump driven thereby, an auxiliary shaft for driving each of the said band rollers, the shafts being co-axial of one another, a clutch member mounted near the adjacent ends of the auxiliary shafts, pneumatic means for sliding the clutch member on to one or the other of the auxiliary shafts and controlled by the aforesaid sliding devices, pneumatic means for retaining the clutch member in its adjusted position, a driving gear wheel on the clutch member, a toothed pinion on the driving shaft in mesh with the driving gear wheel, a pneumatically controlled clutch on the driving shaft, whereby the pinion may be driven for a predetermined period, then stopped, screw worm means for again restoring the drive, a plurality of pneumatic switch means partly under atmospheric pressure and partly under the influence of the air pump, means for operating said switch means by the passage of air through said openings in the stationary member, and means whereby, should any perforation in the band be split, inadvertent operation of the parts will be prevented.

In testimony whereof I have signed my name to this specification in the presence of two subscribing witnesses.

MAXIMILIAN SKRETA.

Witnesses:
 ADOLF ARBTER,
 AUGUST FUGGER.

Copies of this patent may be obtained for five cents each, by addressing the "Commissioner of Patents, Washington, D. C."